United States Patent
Calamia et al.

(10) Patent No.: US 6,220,794 B1
(45) Date of Patent: *Apr. 24, 2001

(54) SPHERICAL SEAT CUTTING APPARATUS

(75) Inventors: Gregory Allen Calamia, Sterling Heights; Alan Joseph Kardos, St. Clair Shores; Terrence John Poltz, Rochester Hills, all of MI (US)

(73) Assignee: Carboloy Inc., Warren, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/262,832

(22) Filed: Mar. 5, 1999

(51) Int. Cl.[7] ........................................ B23C 5/00
(52) U.S. Cl. ............................. 407/40; 407/42; 407/48; 407/65
(58) Field of Search ................ 407/40, 42, 35, 407/47, 48, 54, 65, 102, 103, 113, 114, 115, 107, 66, 53, 34, 12; 82/130

(56) References Cited

U.S. PATENT DOCUMENTS

| 2,134,140 | * | 10/1938 | Miller | 407/47 X |
| 2,202,407 | * | 5/1940 | Sykes | 407/47 X |
| 4,789,273 | * | 12/1988 | Wiacek et al. | 407/42 X |
| 4,838,739 | * | 6/1989 | Stashko | 407/40 X |
| 5,232,317 | | 8/1993 | Peuterbaugh . | |
| 5,741,095 | * | 4/1998 | Charron et al. | 407/42 |
| 5,820,310 | * | 10/1998 | Boianjiu | 407/113 X |

FOREIGN PATENT DOCUMENTS

213925 * 12/1957 (GB) .................................. 407/103

* cited by examiner

Primary Examiner—Henry Tsai
(74) Attorney, Agent, or Firm—Burns, Doane, Swecker & Mathis, L.L.P.

(57) ABSTRACT

A rotary cutting tool for cutting a spherical seat on a surface of a workpiece comprises a body adapted to carry cutting inserts. The body is fixed to a drive shaft which rotates the body about a longitudinal center axis of the body. The body includes a forwardly facing front surface of generally convex shape, and a plurality of insert seats formed in the front surface in circumferentially spaced relationship about the axis. Each of the seats faces forwardly and comprises recesses of generally pyramidal shape. A screw threaded hole extends through each of the seats in a rearward direction and is adapted to receive an insert fastening screw. The cutting inserts include projections of generally pyramidal shape received in respective ones of the recesses. The projections are formed by a first plurality of V-shaped parallel grooves intersected by a second plurality of V-shaped parallel grooves arranged perpendicular to the first groove.

12 Claims, 2 Drawing Sheets

SPHERICAL SEAT CUTTING APPARATUS

BACKGROUND OF THE INVENTION

The invention relates to a cutter for cutting spherical seats in metallic workpieces.

Depicted in FIG. 1 is a prior art spherical seat cutter 20a of the type described in Peuterbaugh U.S. Pat. No. 5,232, 317. The seat cutter 20a cuts a spherical seat S on the interior of a workpiece such as a differential casing D which is fixedly held. Suitable article handling apparatus, not shown, transfers the casing D to and from the work station shown in FIG. 1 in a direction 10 perpendicular to the paper. The casing D has diametrically aligned bores B around which the seats S are cut, as well as a large opening O at its top. The cutter 20a is supported for rotation about its central axis by a hanger 22a which is in turn mounted for vertical and horizontal movement. Cutter 20a includes a steel cutter body 26a formed with a reduced diameter section 28a at its rearward end which is rotatably supported within a bore 30a through hanger 22a. A removable retainer plate 32a detachably coupled to the rearward end of the reduced diameter section 28a of the cutter body retains the cutter against axial movement relative to hanger 22a.

In the tooling arrangement shown in FIG. 1, a single-ended cutter cuts the seat at one side of the differential case at the work station. An alternative arrangement could be provided which utilizes a double-ended cutter, i.e., with a like second body portion 26a projecting from the opposite end of reduced diameter section 28a, initially to cut one seat and then the other seat.

A rotatable drive arbor 34 projects through a central passage 36a extending through cutter 20a and is rotatably supported at opposite sides of the differential casing D by stationary bearing assemblies 38a and 40a. The arbor 34a is formed with splines engageable with complementary splines formed within the central passage 36a. The arbor 34a is coupled to a suitable drive mechanism which is operable to drive the arbor in rotation and to also shift the arbor horizontally.

The cutting of the seat in the workpiece D is performed by indexible cutting inserts 42a detachably mounted in the cutter. The inserts 42a include substantially parallel main surfaces 44a intersected by end surfaces 46a to form cutting edges 48a. The inserts 42a are mounted by fastener screws 50a in recesses formed in a front end surface F of the steel body 26a of the cutter 20a such that the main surfaces 44a lie in planes intersecting the front end surface F. The fastener screws 50a extend tangentially with respect to the axis of rotation.

The cutter 20a may be susceptible to fracture at regions A disposed between the central passage 36a and respective inserts 42a, because the thickness of the steel of the body 26a there is minimal and may not be able to withstand the forces generated at high rpm's.

SUMMARY OF THE INVENTION

The present invention relates to a rotary cutting tool for cutting a spherical seat on a surface of a workpiece. The cutting tool comprises a body adapted to carry cutting inserts. The body has a bore extending therein along a longitudinal center axis of the body for receiving a drive shaft. The body includes a forwardly facing front surface of generally convex shape so as to protrude forwardly. A plurality of insert seats is formed in the front surface in circumferentially spaced relationship about the axis. Each of the insert seats faces generally forwardly and comprises recesses of generally pyramidal shape. A screw-threaded hole extends through each of the seats in a rearward direction and is adapted to receive an insert-fastening screw.

The inverted pyramidal geometry of each insert seat is preferably formed by a first plurality of V-shaped parallel grooves and a second plurality of V-shaped parallel grooves extending perpendicularly to the first plurality of grooves and intersecting the first plurality of grooves.

The invention also pertains to an indexible cutting insert adapted to be mounted on a rotary body. The insert comprises forward and back surfaces disposed generally parallel to one another and intersected by a plurality of end surfaces. The end surfaces intersect the forward surface to form a plurality of cutting edges therewith. The back surface has projections of generally pyramidal shape. The projections are formed by a first plurality of generally V-shaped parallel grooves, and a second plurality of generally V-shaped parallel grooves extending perpendicularly to the first plurality and intersecting the first plurality. The forward surface includes a generally spherical bevel extending around an outer periphery thereof and intersecting the cutting edges.

BRIEF DESCRIPTION OF THE DRAWINGS

The objects and advantages of the invention will become apparent from the following detailed description of preferred embodiments thereof in connection with the accompanying drawings in which like numerals designate like elements and in which.

DETAILED DESCRIPTION OF A PREFERRED EMBODIMENT OF THE INVENTION

Figure 3:
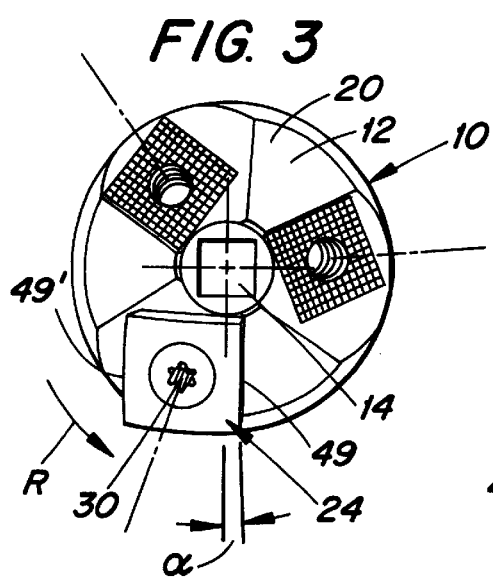
FIG. 3 is a front axial view of a cutting tool according to the present invention, the cutting tool having three insert seats, only one of which being occupied by an insert in FIG. 3.
Figure 4:
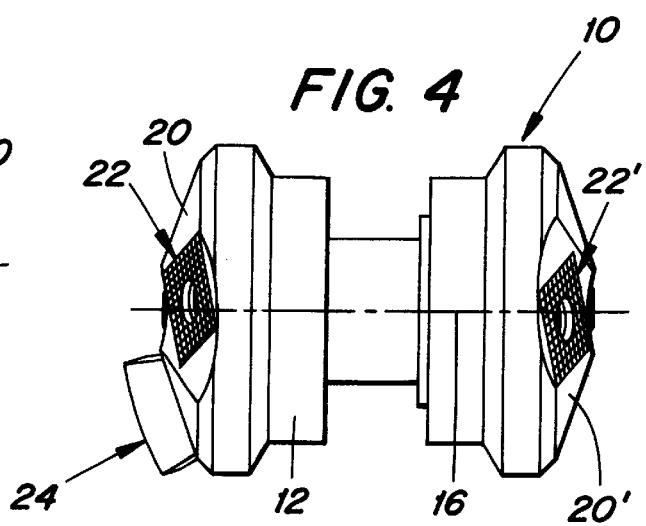
FIG. 4 is a side elevational view of FIG. 3.
Figure 5:
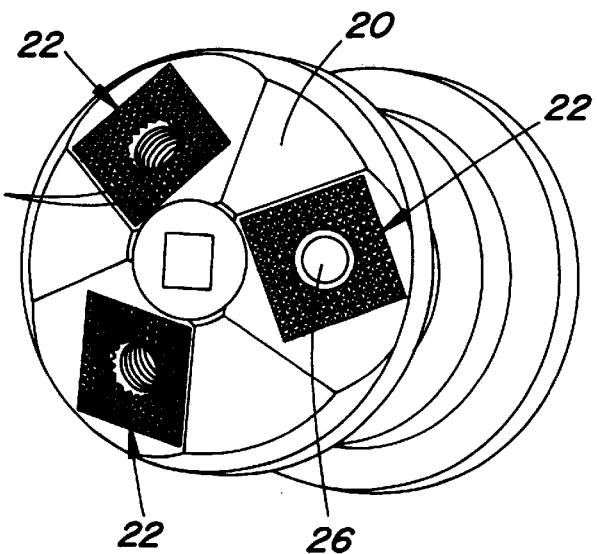
FIG. 5 is a perspective view of FIG. 4.

Depicted in FIGS. 3–5 is a tool body 12 of a cutting tool 10 for cutting spherical seats in a surface of a workpiece. The body includes a through-bore 14 extending therethrough along a longitudinal center axis 16 of the body. The through-bore is of non-circular cross section (e.g., rectangular) and is adapted to receive a drive shaft (not shown) of corresponding cross section. Alternatively, the drive shaft could be internally formed with the body.

The body includes a forwardly facing front surface 20 of generally convex shape, i.e., preferably frusto-conical so as to protrude forwardly. Insert seats 22 are formed in the front surface 20 in circumferentially spaced relationship about the center axis 16. Each insert seat 22 faces generally forwardly and comprises a series of recesses 23 of inverted pyramidal shape, the recesses being arranged in cross rows, some of the rows oriented parallel to one another and perpendicular to other rows. The recesses can be formed by machining or stamping, for example.

Each recess has a depth D in the range of about 0.030 in. to about 0.060 in., most preferably about 0.03125 in. A spacing, or pitch p between adjacent recesses is in the range of from about 0.060 in. to about 0.120 in., most preferably about 0.0625 in.

The insert seats are preferably of square shape to receive square cutting inserts 24, but could be of any other suitable shape, such as triangular, diamond, etc., for receiving correspondingly shaped inserts.

A screw-threaded hole 26 extends rearwardly through the front surface 20 at the midpoint of each insert seat for receiving a fastener screw 30.

Although the insert seats 22 could be symmetrically spaced about the axis 16, they could alternatively be spaced circumferentially by different angles, e.g., 125°, 115° and 120°, in order to break the harmonics created during a cutting operation, as shown in the drawing.

Figure 6:
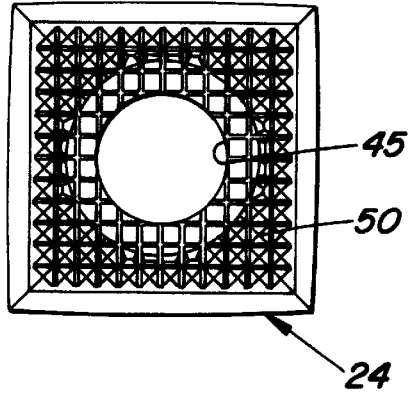
FIG. 6 is a bottom view of a cutting insert according to the present invention.
Figure 7:
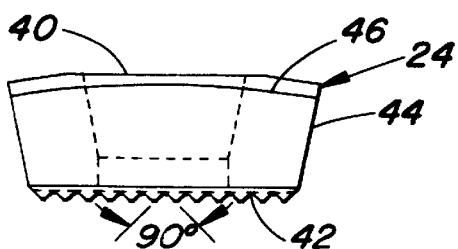
FIG. 7 is a first side view of the cutting insert depicted in FIG. 6.
Figure 8:
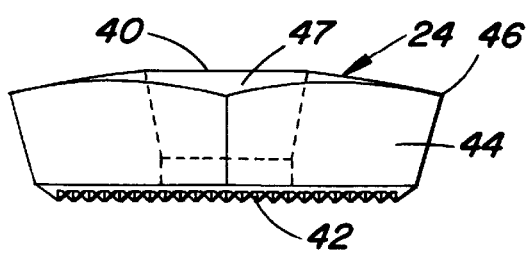
FIG. 8 is another side elevational view of the cutting insert depicted in FIG. 6.

The cutting insert 24, depicted in FIGS. 6–8, is formed of sintered carbide, e.g., tungsten carbide and includes a forward surface 40 and a back surface 42 disposed generally parallel to one another and interconnected by a plurality of end surfaces 44. Preferably, there are four end surfaces 44, whereby an intersection between the forward surface 40 and the end surfaces 44 form cutting edges 46. The insert preferably includes a center hole 45 for receiving a fastener screw.

A spherical bevel 47 is ground into the forward surface to extend around the outer periphery thereof and to define the cutting edges. That bevel also provides a gradually increasing relief angle which promotes strength and improved tool life.

The insert is located so that the active cutting edge 49 thereof (i.e., the leading edge with reference to the direction of rotation) exhibits a negative radial rake a, e.g., five degrees. This allows smoother chip evacuation and smoother cutting. Also, the inserts are preferably arranged such that the active cutting edge 49 is elevated farther off the surface 20 than is the trailing edge 49' of the insert. This also aids in smooth cutting and smooth chip evacuation.

The back surface 42 possesses serrations formed by a first plurality of generally V-shaped parallel grooves intersected at ninety degrees by a second plurality of generally V-shaped parallel grooves. Each V-shaped groove forms an angle of ninety degrees, although any suitable angle could be provided. The grooves are formed during either the pressing and sintering of the insert, or by subsequent grinding.

The serrations of the inserts 24 form projections 50 of pyramidal shape which mesh with the pyramidal recesses 23 of the insert seats 22 when the back surfaces 42 are placed on the insert seats, thereby securing the inserts against movement relative to the tool body 12, and establishing a precise positioning of the inserts.

As noted earlier, the insert seats 22 could be of a shape other than square, e.g., triangular, diamond, etc. In that event, the second rows of grooves would not be oriented at ninety degrees relative to the first rows of grooves, but rather at a different angle, e.g. 45° or 60° or 120° for example, to enable the inserts to be properly indexed.

Figure 1:
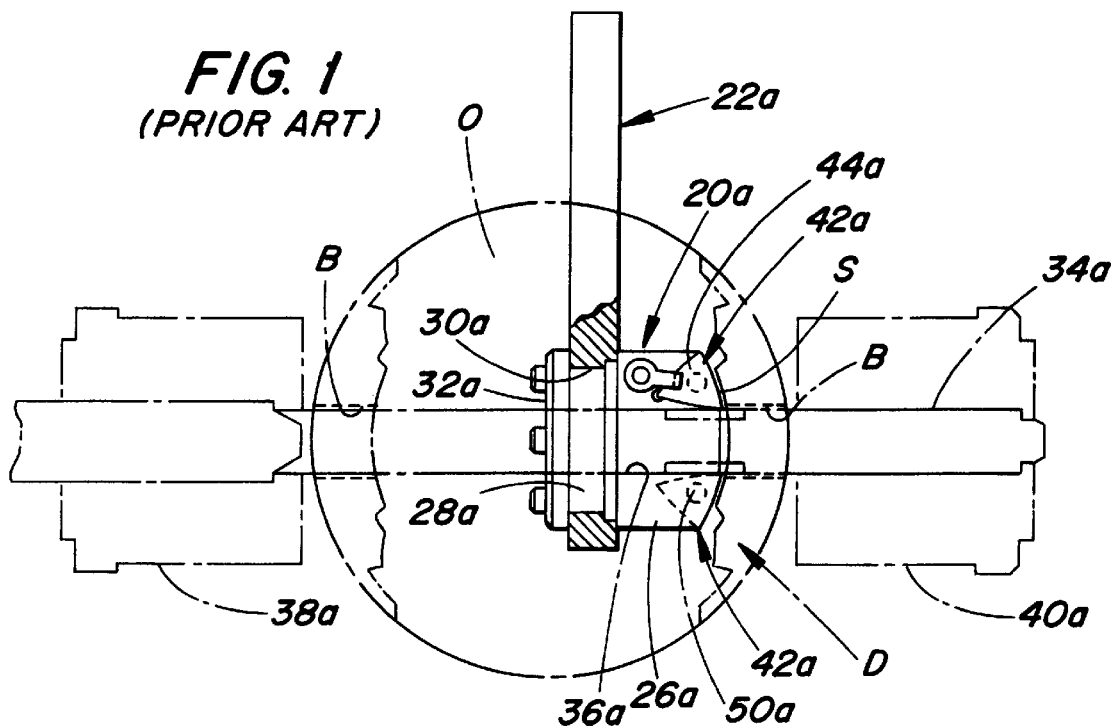
FIG. 1 is a schematic view of a prior art cutting tool for cutting spherical seats in a workpiece.
Figure 2:
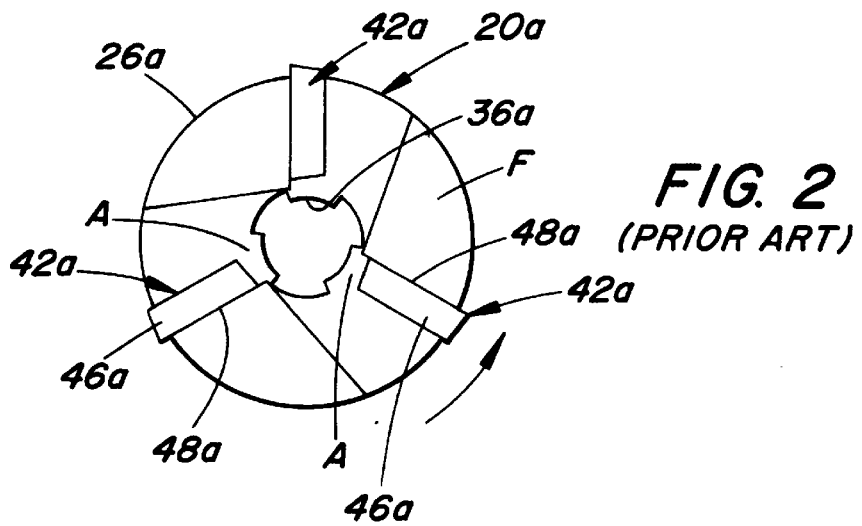
FIG. 2 is a front axial view of the cutting tool depicted in FIG. 1.
Figure 9:
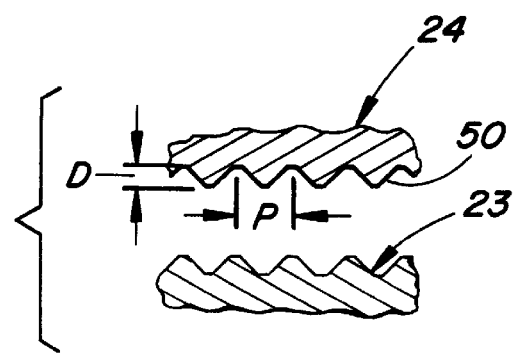
FIG. 9 is a fragmentary enlarged view showing pyramidal recesses of the insert seat and pyramidal projections of the insert.

It will be appreciated that the shortcomings of the prior art are avoided, such as the tendency for the tool body to fracture at points A shown in FIG. 2 since the inserts are now mounted with their back surfaces seated on the front surface of the cutter body. In other words, there is no removal of steel between the carbide insert and the center hole as in the prior art.

Also, there is ample space between adjacent inserts to accommodate the cuttings. Moreover, the spherical bevel that is ground into the forward surface of the insert results in gradually increasing a clearance that also promotes strength and improved tool life. The tool is thus able to cut at a faster speed to reduce the cutting cycle and achieve increased throughput and reduced machined piece price.

The cutting tool 10 preferably includes a rearwardly facing rear surface 20' having insert seats 22' identical to the front seats 22. The rear seats 22' also receive inserts 24 to enable the rear surface 20' to perform a cutting action. Of course, since the shaft which rotates the tool 10 can only rotate in one direction, the front inserts will constitute a right-hand cutter, whereas the rear inserts will constitute a left-hand cutter.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A rotary cutting tool for cutting a spherical seat on a surface of a workpiece, the cutting tool comprising a body having insert seats adapted to carry cutting inserts, a through-bore extending through the body along a longitudinal center axis of the body, the body including a forwardly facing front surface of generally convex shape, all of the insert seats formed in the front surface and arranged in circumferentially spaced relationship around the axis, each of the insert seats facing generally forwardly and comprising recesses of generally pyramidal shape, a screw-threaded hole extending through each of the seats in a rearward direction and adapted to receive an insert-fastening screw, the forwardly facing surface being inclined forwardly toward the center axis, every insert seat on the body being disposed in the inclined forwardly facing surface, wherein the body contains no insert seat other than those disposed in the inclined forwardly facing surface.

2. The rotary cutting tool according to claim 1 wherein the front surface is of generally frusto-conical shape.

3. The rotary cutting tool according to claim 1 wherein each of the forwardly facing insert seats is of generally rectangular shape.

4. The rotary cutting tool according to claim 1 wherein the body further includes a rearwardly facing rear surface of identical shape as the front surface and including insert seats of identical shape as the insert seats disposed in the front surface.

5. The rotary cutting tool according to claim 1 further including cutting inserts mounted on respective insert seats, each insert including a rearwardly facing back surface having projections of generally pyramidal shape received in respective recesses of the insert seat, each insert having a center through-hole, and fastener screws extending through the center through-holes and screwed into the fastener-receiving holes formed in the front surface.

6. The rotary cutting tool according to claim 5 wherein each insert includes a forwardly facing forward surface forming a plurality of cutting edges, each insert being indexible to place a different one of the cutting edges in an active position.

7. The rotary cutting tool according to claim 6 wherein the forward surface of each insert is of square shape to provide four cutting edges.

8. The rotary cutting tool according to claim 6 wherein the forward surface of each insert has a generally spherical bevel along the outer periphery, the bevel defining the cutting edges.

9. The rotary cutting tool according to claim 5 wherein the projections on the insert are formed by a first plurality of generally V-shaped parallel grooves, and a second plurality of generally V-shaped parallel grooves extending perpendicular to the first plurality of grooves and intersecting the first plurality of grooves.

10. The rotary cutting tool according to claim 1 wherein the insert seats are spaced apart circumferentially by different angles.

11. The rotary cutting tool according to claim 5 wherein each insert is arranged such that its active cutting edge exhibits a negative radial rake angle.

12. The rotary cutting tool according to claim 5 wherein each insert is arranged such that its active cutting edge is elevated farther off the front surface than is a trailing edge of the insert.

* * * * *